US012468263B2

(12) United States Patent
Zaugg

(10) Patent No.: US 12,468,263 B2
(45) Date of Patent: Nov. 11, 2025

(54) SYMPATIQUE WATCH AND CLOCK FORMING A SYMPATIQUE HOROLOGICAL ASSEMBLY AND METHOD FOR SETTING THE TIME OF THE WATCH OF SAID SYMPATIQUE HOROLOGICAL ASSEMBLY

(71) Applicant: Montres Breguet S.A., L'Abbaye (CH)

(72) Inventor: Alain Zaugg, Le Sentier (CH)

(73) Assignee: Montres Breguet S.A., L'Abbaye (CH)

( * ) Notice: Subject to any disclaimer, the term of this patent is extended or adjusted under 35 U.S.C. 154(b) by 450 days.

(21) Appl. No.: 17/965,310

(22) Filed: Oct. 13, 2022

(65) Prior Publication Data

US 2023/0205140 A1 Jun. 29, 2023

(30) Foreign Application Priority Data

Dec. 23, 2021 (EP) .................................... 21217368

(51) Int. Cl.
*G04B 27/00* (2006.01)

(52) U.S. Cl.
CPC ......... *G04B 27/007* (2013.01); *G04B 27/001* (2013.01)

(58) Field of Classification Search
None
See application file for complete search history.

(56) References Cited

PUBLICATIONS

George Daniels, "Sympathique, Setting and Regulating the Watch; Sympathique, Setting and Regulating the Watch Each Hour; Sympathique, Setting and Regulating the Watch Once Each Day", The Art of Breguet, Mechanical Techniques, Feb. 24, 1975, pp. 351-360.

European Search Report for 21 21 7368 dated, Jun. 3, 2022.

*Primary Examiner* — Renee S Luebke
*Assistant Examiner* — Matthew Daniel Hwang
(74) *Attorney, Agent, or Firm* — Sughrue Mion, PLLC

(57) ABSTRACT

A sympatique watch (30), including a horological movement to which are connected a watch hour (31) and minute display (32), including a barrel (33), a resonator (34), a time-setting mechanism, a coupling mechanism (38) to separate a display train (35) and a finishing train (36), a stop mechanism (37) of a resonator (34), and a reset mechanism to move each hour (31) and minute display (32) in a predetermined reference position. The watch includes a first and a second actuator (310, 320) cooperating with a first and a second actuator (210, 220) of the clock (20). The first actuator can occupy three successive distinct positions to act on the coupling mechanism (38), the stop mechanism (37) and the reset mechanism. The second actuator can occupy two end positions alternately to act on the time-setting mechanism, only when the first actuator (310) occupies one of its successive distinct positions.

23 Claims, 6 Drawing Sheets

SYMPATIQUE WATCH AND CLOCK FORMING A SYMPATIQUE HOROLOGICAL ASSEMBLY AND METHOD FOR SETTING THE TIME OF THE WATCH OF SAID SYMPATIQUE HOROLOGICAL ASSEMBLY

CROSS REFERENCE TO RELATED APPLICATION

The present application is based on, and claims priority from the prior European Patent Application No. 21217368.6, filed on Dec. 23, 2021, the entire contents of which are incorporated herein by reference.

TECHNICAL FIELD OF THE INVENTION

The invention relates to the very particular field of sympatique clocks and watches.

The invention more particularly relates to a sympatique watch and clock forming a sympatique horological assembly and a method for setting the time of the watch of said sympatique horological assembly.

TECHNOLOGICAL BACKGROUND

Since 1800, Abraham-Louis Breguet has designed sympatique clocks making it possible to wind, set the time and adjust the sympatique watches that are dedicated to them, with no other constraint than placing the watch in a dedicated receptacle arranged on the clock.

These three functions are generally carried out simultaneously at a moment defined by the construction of the clock, generally once or twice a day. This is the case, for example, of the Breguet clock No. 128 and of the associated watch No. 5009 described in the book "L'art de Breguet" by George Daniels. It is the moment when the time-setting is triggered that conditions the precision of the time-setting, this explains the fact that this function is only carried out once or twice a day for the clocks of the 1800s, and every two hours for the clocks of the 1990s.

It should be noted that the sympatique watches of the state of the art are not equipped with an hour correction in addition to the minute correction, which obliges the user to make a preliminary adjustment with a first rough time-setting, in the order of more or less fifteen minutes, the clock carrying out the precise time-setting during the passage.

To this day, these only types of functions have always been applied to the few existing sympatique clocks.

A plurality of drawbacks arise from the constructions of sympatique clocks of the state of the art, particularly, so long as the watch is placed on the clock, it is time-set periodically (every two hours, twelve hours or every twenty-four hours), which unnecessarily biases the time-setting mechanism. Furthermore, the operation of the watch is uncertain if it is not removed from the sympatique clock at a predetermined instant, for example at the end of its time-setting.

In addition, it is not possible, for the user the watch of which is stopped, to perform a start of running of their watch at any moment. They are then obliged to anticipate this start of running and perform a pre-coiling of the watch and a pre-adjustment, and to wait for the next passage at the sympatique time-setting instant.

SUMMARY OF THE INVENTION

The invention resolves the aforementioned drawbacks.

To this end, the present invention relates to a sympatique watch intended to cooperate with a sympatique clock, comprising a horological movement to which is connected at least one time value display, a coupling mechanism making it possible to separate said at least one display and the finishing train, and a reset mechanism intended to move said at least one watch display in a predetermined reference position.

The watch comprises a first and a second actuator respectively intended to cooperate with a first and a second actuator of the clock, said first actuator of the watch capable of occupying at least three successive distinct positions so as to act on the coupling mechanism and on the reset mechanism, said second actuator of the watch being capable of occupying two end positions alternately in order to act on said at least one display by means of a time-setting mechanism, only when the first actuator occupies one of its successive distinct positions.

Thanks to the features of the invention, the watch is capable of being indexed in a step-by-step manner, at any moment. The fact that the first actuator occupies distinct positions in each of which it biases the coupling mechanism, the stop mechanism of the resonator or the reset mechanism, makes it possible to perform a reliable and accurate indexing of the time value display, at any moment.

In particular embodiments, the invention may further include one or more of the following features, taken alone or according to any technically possible combinations.

In particular embodiments, the first actuator is configured to act on the stop mechanism of the resonator of the watch in two successive distinct positions.

The first actuator of the watch is fixed in the case of the watch so as to ensure its water-resistance and airtightness.

The transmission lever is arranged in the movement of the watch.

In other terms, the movement of the first actuator transmits, by means of a single lever, forces to the coupling mechanism, to the stop mechanism of the resonator and to the reset mechanism.

Thus, the movement of the watch has a simple design making it possible particularly to increase its reliability.

In particular embodiments, the first actuator of the watch is configured to act on the coupling mechanism, on the stop mechanism and on the reset mechanism by means of a transmission lever to which it is connected, said transmission lever being configured to concomitantly bias the coupling mechanism and the reset mechanism.

In particular embodiments, the transmission lever extends between a first end of said lever at which it is rotatable and a second end including an excrescence whereby said transmission lever cooperates with the reset mechanism, with the coupling mechanism and with the stop mechanism.

Alternatively, in another embodiment, the transmission lever may be slidably arranged.

In particular embodiments, the transmission lever is subjected to a return force by a lever spring tending to move it in an initial position wherein it drives the reset mechanism in an inactive position, the coupling mechanism in a coupling position and the stop mechanism in a position wherein it releases the resonator.

Thus, when the watch is removed from a receptacle of the clock, the watch may resume normal running on the one hand, and on the other hand the cooperation between the watch and the clock is interrupted with no risk of damaging said watch or said clock.

In particular embodiments, the coupling mechanism includes two arms forming pliers, and a friction spring tending to move the finishing train engaged with the display train.

The arms are biased by a coupling spring towards a coupling position and being configured so that when the first actuator occupies one of its positions, referred to as “first position”, they are driven against the coupling spring, in an uncoupling position wherein they oppose the action of the coupling spring and of the friction spring in order to move said finishing train away from the display train.

In particular embodiments, the arms cooperate with one another at an interface area whereby one of the arms, referred to as “first arm”, is capable of forcing the other arm, referred to as “second arm”, to move towards the coupling position under the effect of the return force generated by the coupling spring, and whereby the second arm is capable of transmitting to the first arm a force to which it is subjected by the transmission lever when the first actuator occupies its first position, this force moving said arms in the uncoupling position.

In particular embodiments, the reset mechanism includes at least one heart-piece cam integral in rotation with the time value display and at least one hammer arranged to bearingly cooperate with said at least one heart-piece cam under the action of a hammer spring, so as to occupy an active position and force in rotation said heart-piece cam until it is bearing against its smallest radius, when the first actuator occupies one of its positions, referred to as “first position”, the hammer being configured to be returned and held in an inactive position by the transmission lever, wherein it is moved away from said heart-piece cam, when the first actuator occupies another position.

In particular embodiments, the transmission lever is configured so that the excrescence is engaged in a notch of the hammer in order that the latter is driven in active position under the action of the hammer spring and so that the excrescence is removed from the notch and bearingly rests against a flank of said hammer in order to drive the latter in inactive position and to hold it in this position.

In particular embodiments, the stop mechanism includes a stop lever subjected to the bias of a spring tending to rotate the latter so that said stop lever is bearingly arranged against a balance of the resonator, the transmission lever being configured so that the excrescence exerts a force going against that of the spring applied against said stop lever.

Alternatively, the spring may be configured to tend to move the stop lever control away from the balance of the resonator. The transmission lever is then configured so that the excrescence rests against the stop level control so as to exert a force going against that of the spring applied against said stop lever control to bring it bearing against the balance.

In particular embodiments, the horological movement of the watch includes a toothed wheel supported by a minute display disc and cooperating with a jumper for holding in position a minute display according to a regular step.

Alternatively, the horological movement of the watch may include a minute display disc a gear of which includes a suitable number of teeth to drive the hour display by the motion-work and to cooperate with a jumper to perform the holding in position of the minute display according to a regular step. Thus, the horological movement may not include a dedicated toothed wheel, intended to hold in position the minute display.

In particular embodiments, the time-setting mechanism may include a time-setting mobile component adapted to be biased by an impulse of the second actuator of the watch so as to rotate a minute display disc one step per impulse of the second actuator of the watch and in a single direction of rotation.

According to another object, the present invention relates to a sympatique clock intended to cooperate with a sympatique watch as described above.

The clock includes at least one clock time value display driven by a clock horological movement, and a first and a second actuator intended to cooperate respectively with the first and the second actuator of the watch.

The first actuator of the clock is configured so as to move the first actuator of the watch in its at least three successive distinct positions, and the second actuator of the clock is configured so as to move the second actuator of the watch between its two positions, by a to-and-fro motion, when the first actuator of the watch occupies one of its positions, the horological movement of the clock including at least one control means configured to control or prohibit the movement of the first actuator of the clock.

In particular embodiments, the horological movement of the clock comprises a snail cam kinematically connected to the time value display(s) of the clock, so that its angular position characterises a value of said time value display(s), and on the periphery of which is bearingly arranged a first end of a feeler-spindle when it occupies an active position, said first end being set back from the snail cam when the feeler-spindle occupies a rest position.

The horological movement is configured to drive in movement the second actuator of the clock, during the travel of the feeler-spindle between its rest position and its active position, according to a number of to-and-fro motions representative of the difference between the reference position of the time value display(s) of the watch and the time value indicated by the time value display(s) of the clock.

In particular embodiments, the feeler-spindle includes at a second end opposite the first end, a rack arranged to cooperate with a first toothed wheel of a transmission train, said transmission train comprising a second toothed wheel connected to the second actuator of the clock so as to move it in a to-and-fro motion during the movement of the feeler-spindle from its rest position up to its active position.

In particular embodiments, the second toothed wheel meshes with a ratchet rotated by a dedicated energy source and including a plurality of triangular teeth against one of which is intended to be bearingly arranged the second actuator of the clock in such a way as to be animated by a to-and-fro motion during the rotation of the ratchet.

In particular embodiments, the second toothed wheel is connected to the second actuator of the clock by means of a connecting rod-crank handle mechanism, the connecting rod of which is intended to be integral with the second actuator of the clock and the crank handle of which is integral in rotation with the second toothed wheel.

In particular embodiments, the horological movement of the clock includes a coupling lever adapted to occupy an uncoupling position wherein it separates the first toothed wheel and an auxiliary barrel intended to rotate said first toothed wheel and the second toothed wheel.

The horological movement of the clock further comprises an all-or-nothing device configured to cooperate with the coupling lever so as to drive it in the uncoupling position when the feeler-spindle reaches its active position, so that said feeler-spindle is driven in its rest position under the effect of a feeler-spindle return spring.

In particular embodiments, the ratchet is integral with a multiplication train connected to a regulation mechanism so as to regulate the rotation of said ratchet. The regulation mechanism consists of an escapement and an oscillator.

In particular embodiments, the horological movement of the clock comprises a cam rotated by a dedicated energy source and including a cam profile against which the first actuator of the clock is bearingly arranged, said cam profile including successive portions adapted to move said first actuator according to at least three distinct positions, so as to define a time cycle of predetermined positions.

In particular embodiments, said at least one control means is configured to lock or release the rotation of the cam.

In particular embodiments, the cam is integral with a multiplication train and with a regulation mechanism consisting of an escapement and an oscillator so as to regulate the rotation of said cam.

Yet another aspect of the invention relates to a sympatique horological assembly comprising a sympatique watch and a sympatique clock as described above.

Yet another aspect of the invention relates to a method for setting the time of a watch of a sympatique horological assembly as described above, successively comprising:

- a first phase wherein the first actuator of the clock drives the first actuator of the watch in a first position wherein it biases the reset mechanism so as to move at least one time value display of the watch up to its reference position, it acts on the coupling mechanism so as to cause the uncoupling of the finishing train and of the display train,
- a second operational phase wherein the first actuator of the clock on the one hand drives the first actuator of the watch in a second position wherein it drives the hammer in inactive position, and on the other hand causes the actuation of the second actuator of the clock so that the latter drives the second actuator of the watch in a to-and-fro motion between its two end positions,
- a third operational phase wherein the first actuator of the clock on the one hand drives the first actuator of the watch in a third position wherein it causes the coupling of the coupling mechanism, the first actuator of the clock controlling the first actuator of the watch to begin the implementation of the third operational phase, when the time value indicated by the time value display(s) of the clock corresponds to the time value indicated by the time value display(s) of the watch.

In particular implementations, during the first operational phase, the first actuator of the watch biases the stop mechanism so as to immobilise the resonator, during the second operational phase, the first actuator of the watch holds in position the stop mechanism, and during the third operational phase, the first actuator of the watch biases the stop mechanism so as to release the resonator.

BRIEF DESCRIPTION OF THE FIGURES

Other features and advantages of the invention will become apparent upon reading the following detailed description given by way of non-limiting example, with reference to the appended drawings wherein.

DETAILED DESCRIPTION OF THE INVENTION

Figure 1:
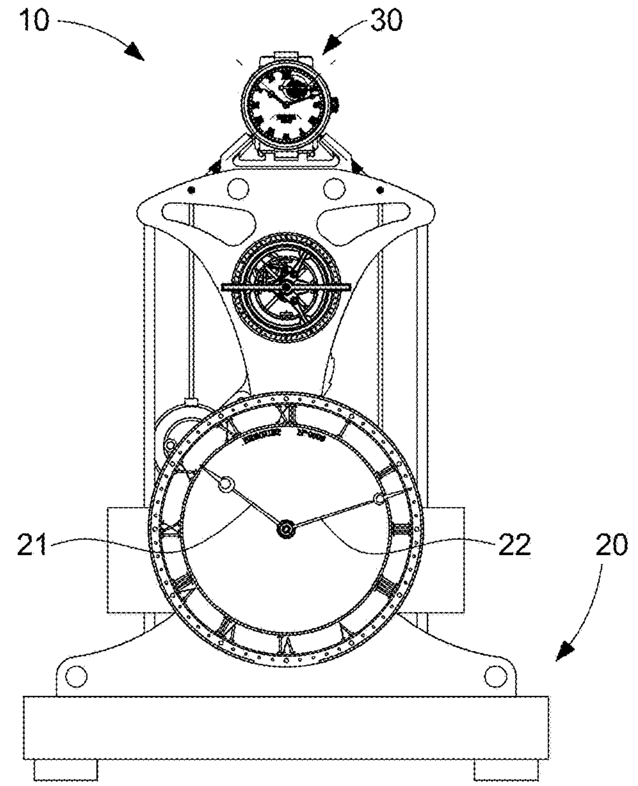
FIG. 1 shows schematically a front view of a sympatique horological assembly according to one embodiment of the invention, including a sympatique clock and a sympatique watch.

The invention relates to a sympatique watch 30, a sympatique clock 20 and a sympatique horological assembly 10 formed by said watch and said clock, as can be seen in FIG. 1.

The sympatique clock 20 includes at least one time value display, such as a clock hour display 21 and a clock minute display 22 driven by a clock horological movement so as to indicate a current time. The sympatique watch 30 comprises, in a manner similar to the sympatique clock 20, a horological movement to which is connected at least one time value display, such as a watch hour display 31 and a watch minute display 32.

Generally, in the present text "display" means any mobile display element known in horology: hand, ring, disc, cursor, flag, etc.

In the remainder of the text, through misuse of language, the sympatique clock 20 and the sympatique watch 30 are designated respectively by the terms "clock" and "watch".

The horological movement of the watch 30 includes, conventionally, at least one energy storage barrel 33, for supplying energy to at least one resonator 34, one time-setting mechanism, one display train 35 connected to the watch displays and one finishing train 36.

The horological movement of the watch 30 advantageously includes a stop mechanism 37 of the resonator 34, that can be seen in FIGS. 2 to 5. The stop mechanism 37 of the resonator 34 preferably comprises a stop lever 370 arranged to cooperate with an inertial mass, for example consisting of a balance, of the resonator 34, to immobilise it or release it.

The stop lever 370 is preferably supported by a stop lever control 371 subjected to the bias of a spring (not shown in the figures) tending to rotate it so that said stop lever 370 is bearing against the control of the resonator 34 to immobilise it.

Figure 6:
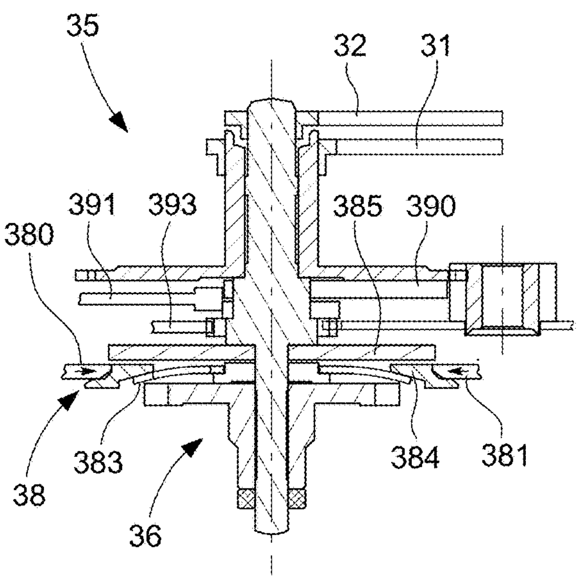
FIG. 6 shows schematically and in sectional view a portion of a finishing train, a display train, a reset mechanism and a coupling mechanism of the horological movement in one embodiment of the watch of FIG. 1, the coupling mechanism being uncoupled.
Figure 7:
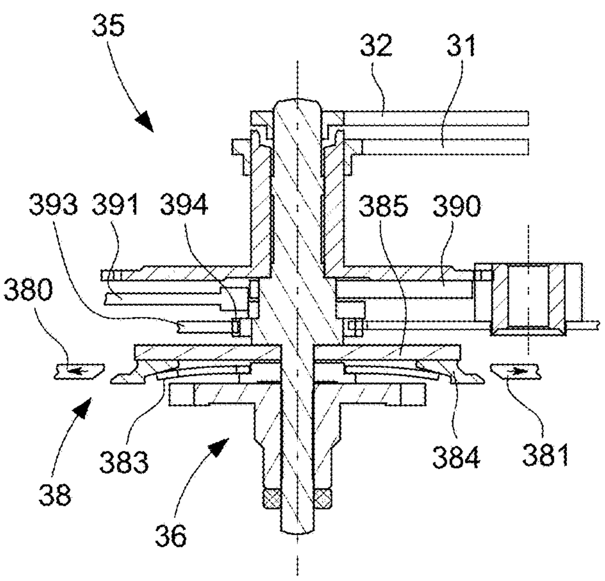
FIG. 7 corresponds to FIG. 6 wherein the uncoupling mechanism is coupled.

Furthermore, the horological movement of the watch 30 preferably comprises a coupling mechanism 38 making it possible to separate the display train 35 from the finishing train 36, as illustrated in FIGS. 6 and 7.

The coupling mechanism 38 makes it possible, when it is uncoupled, to rotate the hour 31 and minute displays 32 independently of the finishing train 36, and when it is coupled to drive the display train 35, and therefore said displays, by the finishing train 36.

Figure 3:
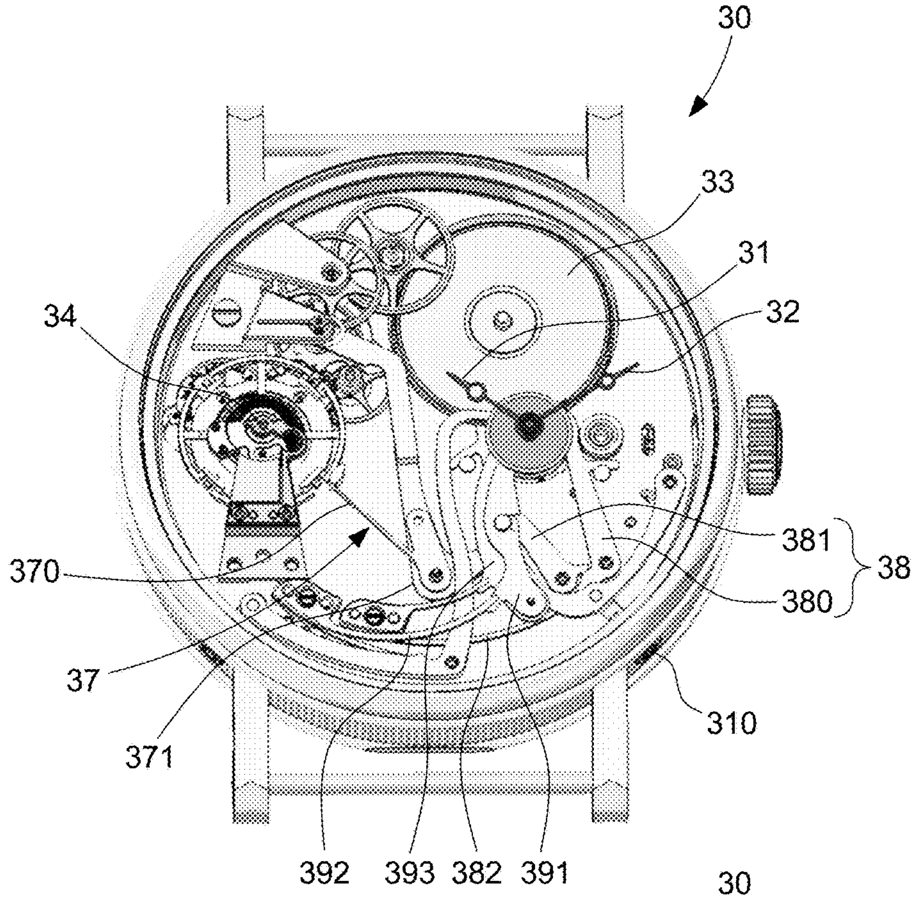
FIGS. 3 to 5 show respectively a front face of the sympatique watch of FIG. 1 wherein a horological movement is partly visible, in three different operational phases of a method for setting the time of the watch by the clock.
Figure 4:
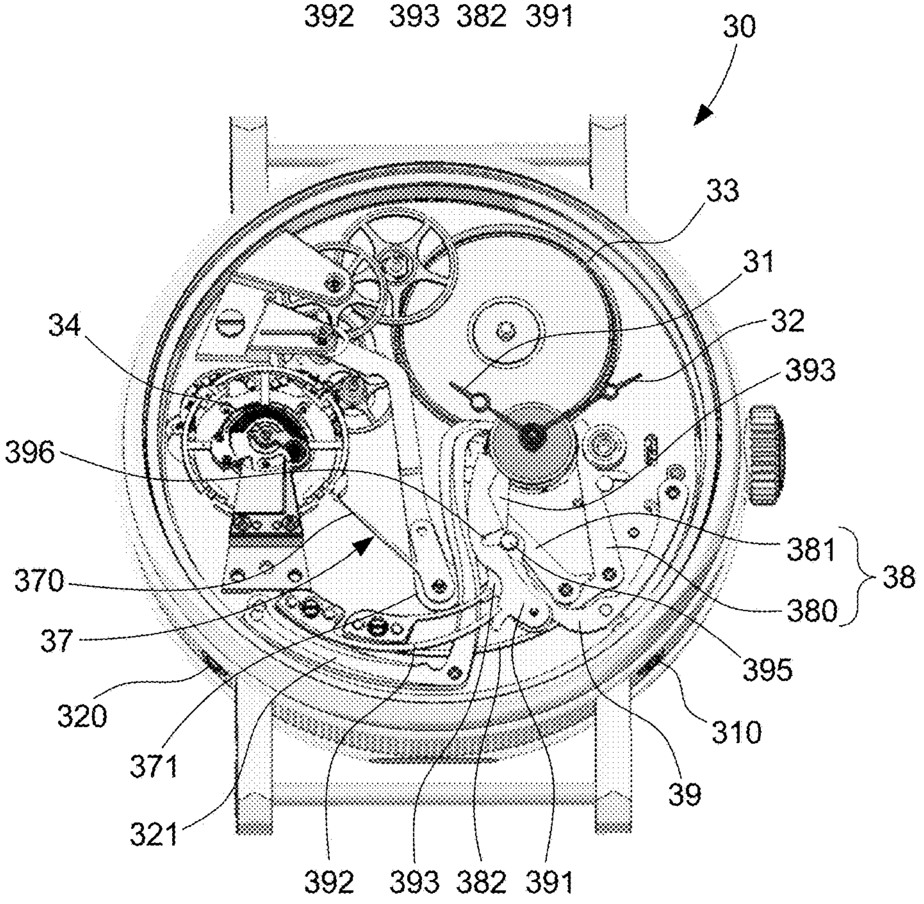
Figure 5:
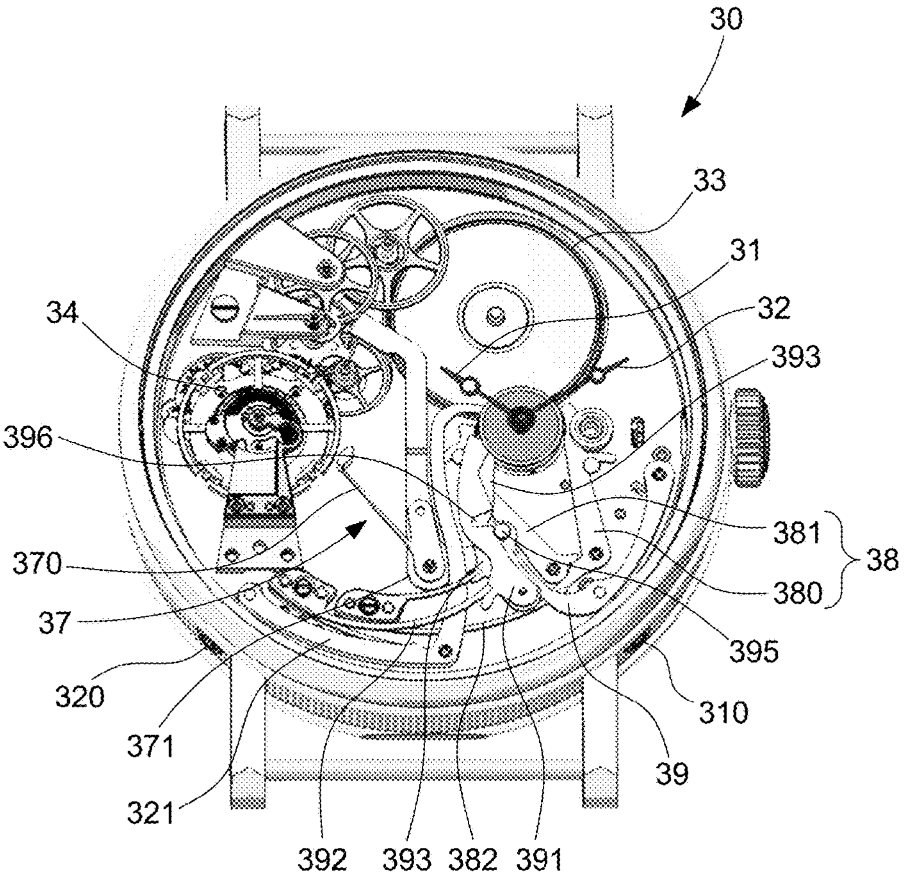

As shown in particular in FIGS. 3 to 5 in one embodiment, the coupling mechanism 38 includes two arms 380 and 381 forming pliers the function of which is to ensure the coupling and the uncoupling. The coupling and uncoupling positions are defined by the angular separation of the arms 380 and 381 in relation to one another. The coupling mechanism 38 is coupled when the arms 380 and 381 are separated from one another and is uncoupled when the arms 380 and 381 are moved closer to one another, as shown in FIGS. 3 and 5 corresponding to FIGS. 6 and 7.

The two arms 380 and 381 are biased towards the coupling position by a coupling spring 382. In particular, in the preferred embodiment shown in FIGS. 3 to 5, the coupling spring 382 applies a return force on one of the arms called "first arm" 380 in the remainder of the text, which is configured to transmit this return force to the other arm, called "second arm" 381.

The coupling mechanism 38 moreover includes a friction spring 383, that can be seen in FIGS. 6 and 7, assembled on the finishing train 36 and tending to move a mobile felloe 384 axially against the display train 35, so that said finishing train 36 is engaged by friction of this felloe 384 with a disc 385 integral with said display train 35. The arms 380 and 381 are arranged to oppose the action of the friction spring 383 in order to move said finishing train 36 away from the display train 35 when the coupling mechanism 38 is uncoupled.

Figure 11:
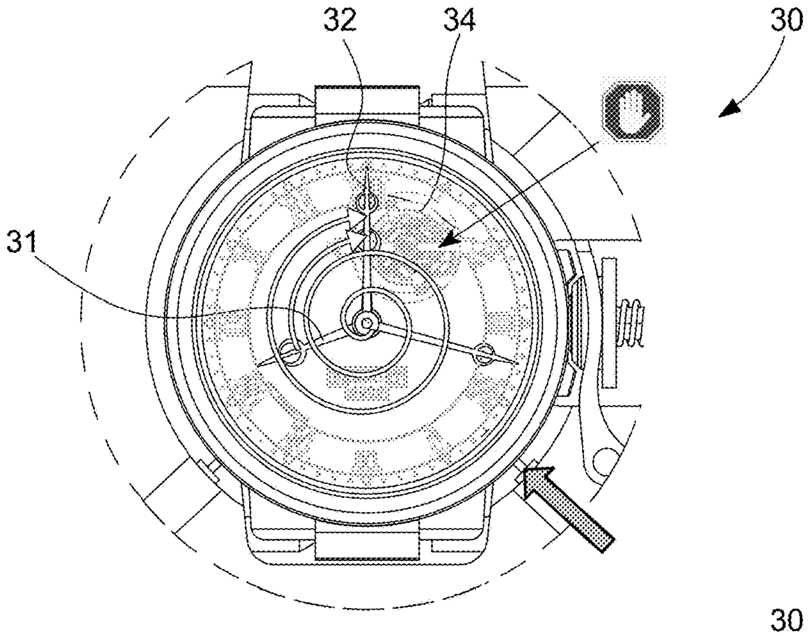
FIGS. 11 to 13 correspond respectively to FIGS. 3 to 5 and show the hour displays and minute displays of the watch.

The horological movement of the watch 30 also advantageously includes a reset mechanism intended to move each hour 31 and minute display 32 of the watch 30 in a predetermined reference position, for example to ten hours and ten minutes in FIG. 3, or twelve hours and zero minutes in FIG. 11.

Figure 8:
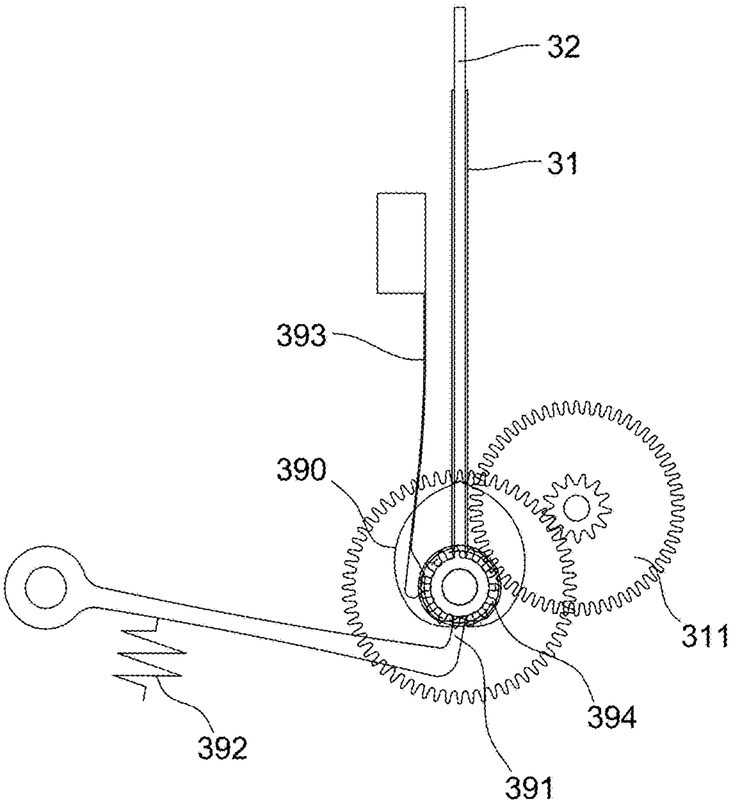
FIG. 8 shows schematically and in front view the reset mechanism of FIG. 6.
Figure 10:
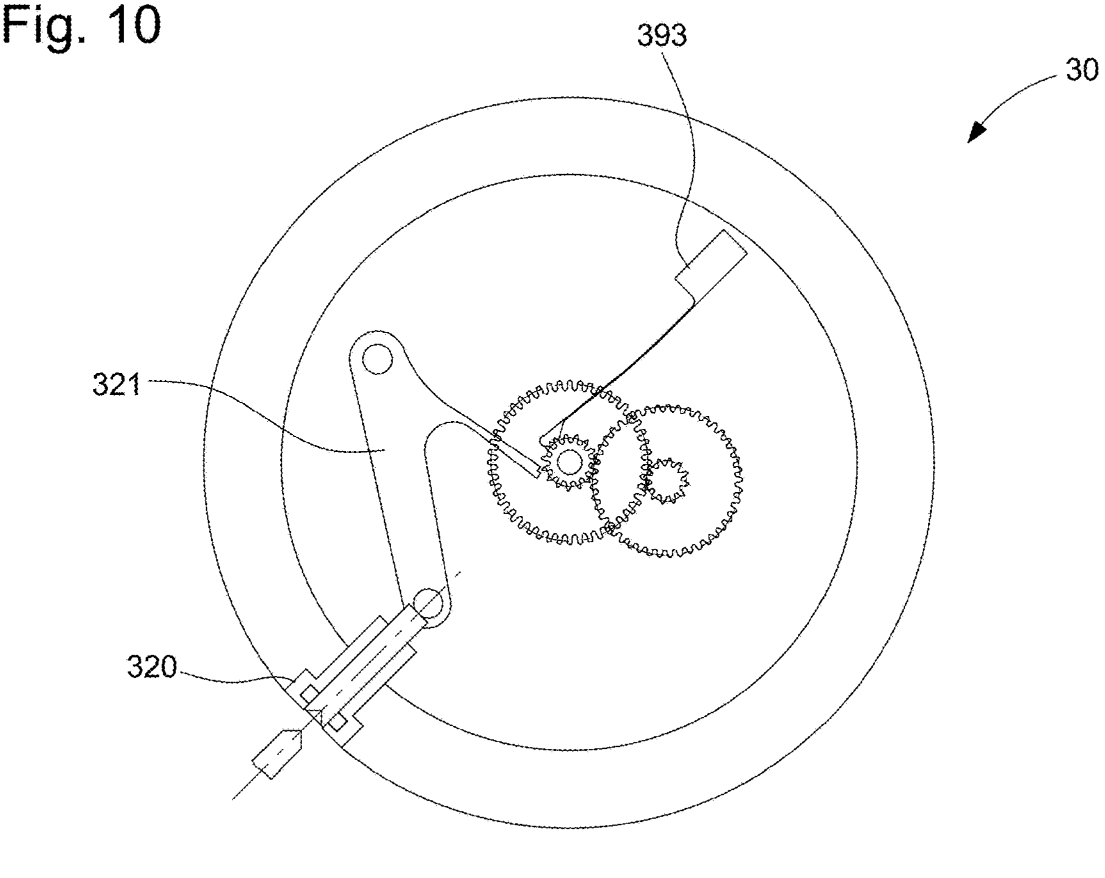
FIG. 10 shows schematically and in front view, the connection between the hour and minute display of the watch of FIG. 1 and the second actuator of said watch by a time-setting control.

To this end, in one embodiment shown schematically in FIG. 8 and that can be partially seen in FIGS. 3 to 5, the reset mechanism includes a heart-piece cam 390 integral in rotation with the hour display 31, and a hammer 391 arranged to bearingly cooperate with said heart-piece cam 390 under the action of a hammer spring 392, so as to occupy an active position wherein it forces in rotation the heart-piece cam 390 up to its smallest radius.

Alternatively, in another embodiment not shown in the figures, the reset mechanism includes a heart-piece cam integral with the hour display and a heart-piece cam integral with the minute display 32, and includes two hammers arranged to respectively bearingly cooperate with each of said heart-piece cams, under the action of dedicated springs.

In the embodiment shown schematically in FIG. 8, the minute display 32 is driven towards the predetermined reference position by the hour display 31 and by a motion-work train 311.

The hammer 391 may be returned and held in an inactive position, also referred to as "coiled position" in the remainder of the text, by an actuator as described in more detail below, so as to move it away from the heart-piece cam 390 when the watch 30 indicates the current time, that is to say when it is in a state referred to as "normal running". Furthermore, the hammer 391 is held in coiled position when the watch 30 is time-set as described in more detail hereafter.

As shown in FIG. 8, the horological movement of the watch 30 may also include a toothed wheel 394, such as a star, supported by a minute display disc and intended to cooperate with a jumper 393 to hold the minute display 32 in position according to a regular step when said watch 30 is time-set as described in more detail hereafter.

Figure 2:
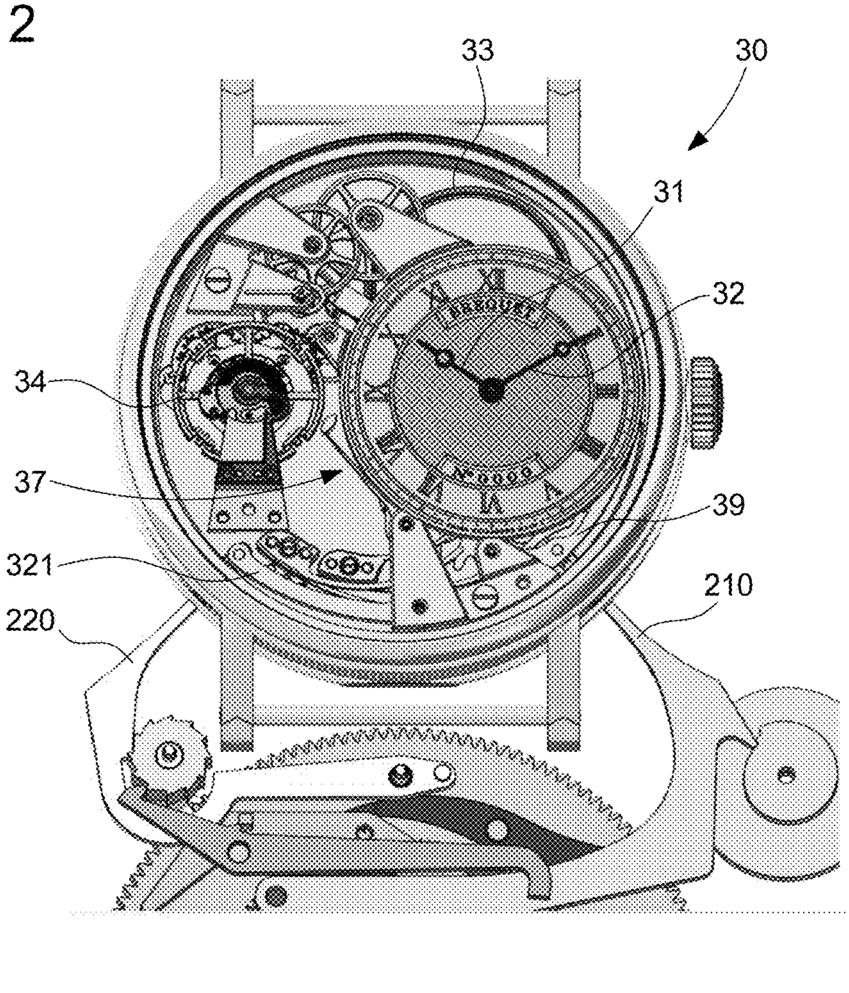
FIG. 2 shows a detailed view of FIG. 1, wherein a first and a second actuator of the clock cooperate respectively with a first and a second actuator of the watch.
Figure 9:
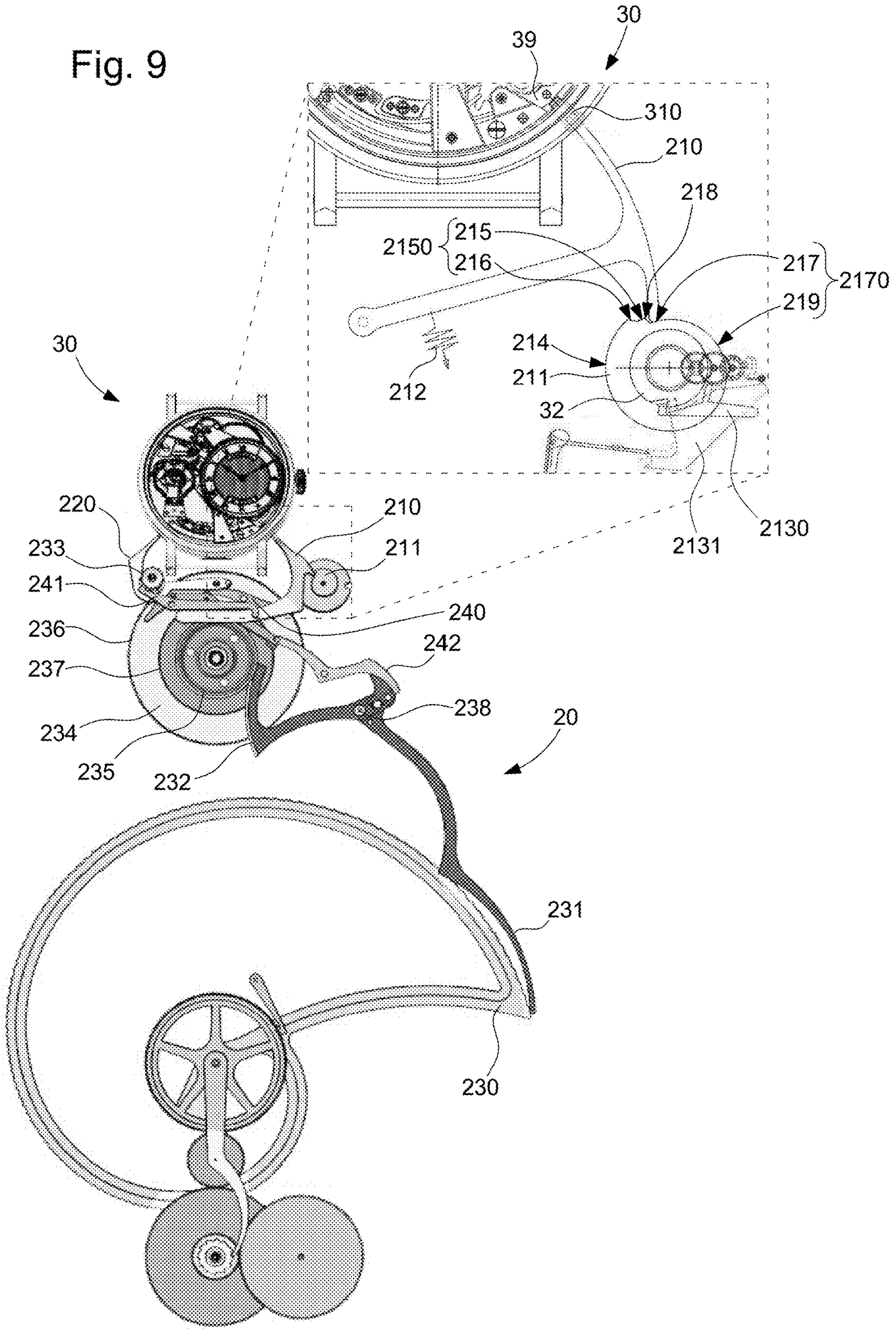
FIG. 9 shows schematically and in front view means for driving the actuators of the clock of FIG. 2 and a detailed view of the first actuator of the clock.

The sympatique assembly 10 includes at least one connection mechanism between the clock 20 and the watch 30, schematically shown in FIGS. 2 and 9, intended to mechanically cooperate the clock 20 and the watch 30 when it is deposited in a receptacle of the clock 20, in a transfer position.

According to the invention, this connection mechanism includes at least two distinct transmission lines having functions different from one another and intended to transmit a movement of the clock 20 to the watch 30.

Each transmission line consists of an actuator of the watch 30 and of an actuator of the clock 20, said actuators being capable of cooperating with one another.

In particular, the watch 30 includes a first and a second actuator 310 and 320 respectively intended to cooperate with a first and a second actuator 210 and 220 of the clock 20.

When the watch 30 is arranged in the receptacle in transfer position, the first and second actuators 210 and 220 of the clock 20 are intended to cooperate respectively with the first and second actuators 310 and 320 of the watch 30 so as to transmit to them a movement, preferably a translational movement.

Preferably, the first and second actuators 310 and 320 of the watch 30 are in the form of push-pieces as shown in FIGS. 3 to 5, 9 and 10.

In embodiments not shown in the figures, the first and second actuators 310 and 320 of the watch 30 and the first and second actuators 210 and 220 of the clock 20 include, at their ends whereby they cooperate, coupled magnetic or ferromagnetic elements that make it possible to guide the transmission of the translational movement.

In the preferred embodiment of the invention, the first actuator 310 of the watch 30 is connected to a transmission lever 39 so that the movement of said first actuator 310 of the watch 30 modifies the angular position of said transmission lever 39. More specifically, the first actuator 310 is connected to the transmission lever 39 by a pivot arranged between a first end of said lever at which it is rotatable.

Advantageously, the transmission lever 39 is configured so as to be adapted to cooperate with the hammer 391, with the coupling mechanism 38, with the minute jumper 393 and with the stop lever 370.

More particularly, the transmission lever 39 includes an excrescence, for example formed by a post or a pin 395 arranged at its second end. In the remainder of the text, the excrescence is designated by a pin for clarity purposes.

The pin 395 is capable of bearingly resting against the stop lever control 371 so as to exert a force going against that of the spring applied against said stop lever control 371.

Moreover, according to the position of the first actuator 310 of the watch 30, the pin 395 is capable of bearingly resting against a flank of the hammer 391 so as to hold it in coiled position and is capable of engaging in a notch 396 of said hammer 391 so as to enable its movement in active position under the action of the hammer spring 392.

Furthermore, the pin 395 is adapted to press against one of the arms 381 of the coupling mechanism 38 so as to be able to drive said coupling mechanism 38 in the uncoupling position.

In addition, the pin 395 is adapted to press against one of the flanks of the jumper 393 so as to be able to, according to the position of the transmission lever 39, hold said jumper 393 in a coiled position, wherein it is inactive, or make its movement possible in an active position wherein it cooperates with the toothed wheel 394, under the action of a jumper spring 3962, by engaging in a notch 3961 of said jumper 396.

More specifically, in the preferred embodiment of the invention shown in FIGS. 3 to 5, the pin 395 presses against a flank of the second arm 381 and is capable, during the movement of the transmission lever 39, of causing the movement of said second arm 381 against the return force of the coupling spring 382. Advantageously, the second arm 381 is configured to drive the first arm 380 in movement against the return force of said coupling spring 382.

In particular, as can be seen in FIGS. 3 to 5, the first and the second arms 380 and 381 cooperate with one another at an interface area whereby the first arm 380 forces the second arm 381 to move towards the coupling position under the effect of the return force generated by the coupling spring 382, and whereby the second arm 381 is capable of transmitting a force to the first arm 380 going against the return force, under the effect of the movement of the pin 395, so as to move said first arm 380 and the second arm 381 in uncoupling position.

By way of example, as shown in FIGS. 3 to 5 generally and in a more detailed and schematic manner in FIG. 11, the second actuator 320 of the watch 30 may take the form of a corrector rod intended to cooperate with the second actuator 220 of the clock 20.

The time-setting mechanism of the watch 30 may include a time-setting mobile component, such as time-setting control 321 formed by a first arm adapted to be biased by the corrector rod to move said time-setting control 321, and by a second arm the free end of which is adapted to rotate the minute display disc, for example by one tooth per to-and-fro motion of the second actuator 320.

The minute display disc is held in position by the jumper 393, between each movement caused by the bias of the second actuator 320 and after the time-setting of the watch 30.

The clock 20 is intended to set the time of the watch 30, at the request of a user or of the clock 20, by the action of the first and second actuators 210 and 220 on those of said watch 30 as described in the remainder of the text. The time-setting of the watch 30 makes it possible to adjust, for example, the following indications: hours, minutes, dates, days of the week, month, moon phase. The present text describes a time-setting making it possible to adjust the hour and minute display of the watch 30 step by step.

As described in more detail hereafter, the first actuator 310 of the watch 30 is configured to adopt a plurality of successive distinct positions, under the action of the first actuator 210 of the clock 20. In other words, the bias of the first actuator 310 of the watch 30 by the first actuator 210 of the clock 20 makes it possible to perform time-setting operations of the displays of the watch 30 sequentially.

In particular, following each bias of the first actuator 210 of the clock 20 on the first actuator 310 of the watch 30, phases of a method for setting the time of the watch 30 by the clock 20 are performed successively.

In one of the phases, referred to as "initial phase", the watch 30 and the clock 20, and in particular their respective actuators, do not cooperate with one another so that the watch 30 can be freely removed from the receptacle.

During the following phases, referred to as "operational phases", the first and second actuators 310 and 320 of the watch 30 cooperate respectively with those of the clock 20 so that the actuators of the clock 20 can impart a movement on the actuators of the watch 30. In particular, successive biases of the first actuator 210 of the clock 20 drive the sequencing of all of the operational phases following the initial phase, cyclically.

Each phase corresponds to a specific position of the first actuator 210 of the clock 20, and as a consequence, of the first actuator 310 of the watch 30.

In a particular embodiment of the invention, the means of the clock 20 are described hereafter that make it possible to act on the first and second actuators 210 and 220 of said clock 20 so that the latter bias respectively the first and second actuators 310 and 320 of the watch 30.

As can be seen in the schematic representation of FIG. 9, the horological movement of the clock 20 may comprise a snail cam 230 on the periphery of which is bearingly arranged a first end of a feeler-spindle 231 when it occupies an active position. Said first end of said feeler-spindle 231 is arranged set back from the snail cam 230 when it occupies a rest position wherein it is biased by a feeler-spindle return spring not shown in the figures. The rest position of the feeler-spindle 231 corresponds to the reference position of the displays of the watch 30 added with a safety time corresponding to a time lag desired for setting the time of the watch and for ensuring a waiting time, for example of five minutes, for restarting the watch, as described hereafter.

The snail cam 230 is kinematically connected to the hour display 21 of the clock 20, so that its angular position characterises a value of said hour display 21 of the clock 20 and consequently of the current time.

More specifically, the snail cam 230 is arranged so as to perform one revolution in twelve hours and includes one hundred and forty-four bearings around its circumference. The feeler-spindle 231 is then susceptible to rest on contact with a new bearing every five minutes.

Advantageously, as shown in FIG. 9, the horological movement of the clock 20 may include a jumping mechanism connecting the hour display 21 to the snail cam 230, so as to rotationally drive the latter every 5 minutes.

The feeler-spindle 231 is rotatably arranged so as to transmit the value of the hour display 21 of the clock 20 towards the second actuator 220 of the clock 20. In particular, during its travel between the rest position and the active position, the feeler-spindle 231 is configured to make it possible to drive in movement the second actuator 220 of the clock 20 over a travel representative of the difference between the reference position of the displays of the watch 30 and the current time indicated by the displays of the clock 20.

In particular, the feeler-spindle 231 is connected to a rack 232 at a second end opposite the first end, by means of an elastic connection 238. The rack 232 is arranged to cooperate with a transmission train configured to drive the second actuator 220 according to the time indicated by the minute 22 and hour displays 21 of the clock 20. The transmission train is preferably intended to be rotated by a dedicated energy source, preferably by a dedicated barrel, referred to as "auxiliary barrel" 234. However, it should be noted that the energy source may alternatively take the form of a weight connected by a cable to a drum, in a manner known as such by the person skilled in the art.

This reference taking of the time indicated by the clock 20 is done in a similar manner, with just one difference, to that carried out by a minute component of an on-demand minute repetition mechanism. The difference resides in the fact that in the present invention, the counting is performed by the travel of the feeler-spindle 231 from its rest position up to its active position, that is to say when the feeler-spindle 231 moves up to the contact of the snail cam 230; whereas for a minute repetition, the counting is performed by the travel of a minute component from an active position wherein it is in contact with the snail of the minutes, up to a rest position.

Even more specifically, in one embodiment of the invention, the transmission train comprises a first toothed wheel 235 meshed with the rack 232, and a second toothed wheel 236 disposed to be able to move the second actuator 220 of the clock 20, said first and second toothed wheel 235 and 236 being kinematically connected to one another. Preferably, the first and the second toothed wheel 235 and 236 are supported by the auxiliary barrel 234 and kinematically connected to the second actuator 220, like the watch in FIG. 9.

The horological movement of the clock 20 further includes a coupling lever 240 adapted to separate the first and the second toothed wheel 235 and 236 from one another, and more specifically the first toothed wheel 235 and the auxiliary barrel 234. Preferably, the coupling lever 240 is rotatably fixed on the frame of the clock and is configured so as to be, in a coupling position, engaged with a toothed wheel, referred to as "third toothed wheel" 237, kinematically connected to the toothed wheel 235 by a satellite train, and to be, in an uncoupling position, clear of said third toothed wheel 237.

The second toothed wheel 236 is advantageously meshed with an output wheel, here formed by a ratchet 233 rotatably arranged and having a plurality of triangular teeth, also called "wolf-teeth" by the person skilled in the art, against one of which is bearingly arranged the second actuator 220 of the clock 20. This second actuator 220 of the clock 20 takes the form of a control lever in the preferred embodiment of the invention shown in FIGS. 2 and 9. This control lever is for example biased towards the ratchet 233 by elastic return means or by gravity, in such a way as to be animated by a to-and-fro motion during the rotation of the wolf-teeth of the ratchet 233.

The second actuator 220 is thus adapted to alternately take two distinct end positions during the rotation of the ratchet 233.

The second actuator 220 of the clock 20 ensures a transmission of an impulse to the second actuator 320 of the watch 30, in order to move it between two end positions.

The rotational speed of the ratchet 233 is advantageously regulated by an escapement speed regulator known as such by the person skilled in the art and similar to that shown on the detailed view of FIG. 9 for the regulation of the rotation of the cam of the first actuator.

The elastic connection 238 is connected to an all-or-nothing device 242 adapted to act on the ratchet 233 and on the coupling lever 240. The elastic connection 238 and the all-or-nothing device 242 are configured so that, when the feeler-spindle 231 is rotated by the rack 232, under the effect of the auxiliary barrel 234, up to arriving in contact with the snail cam 230, the elastic connection 238 deforms and biases the all-or-nothing device 242 such that the latter immobilises the ratchet 233 and pivots the coupling lever 240 in order to separate the first toothed wheel 235 and the auxiliary barrel 234. In particular, the all-or-nothing device 242 includes a hook 241 adapted to cooperate with the teeth of the ratchet 233 so as to immobilise the latter.

The coupling lever therefore releases the feeler-spindle 231 from the grip of the auxiliary barrel 234, which makes it possible for the rack 232 and for the feeler-spindle 231 to resume their rest positions under the constraint of their return spring (not shown in FIG. 9).

The movement of the feeler-spindle 231 from its rest position up to its active position is triggered by the first actuator 210 of the clock 20, by dedicated means not shown in the figures and within the reach of the person skilled in the art, when said first actuator 210 occupies a predetermined position as described in more detail in the remainder of the text.

In short, upon triggering the first actuator 210, the feeler-spindle 231 is rotated through the intermediary of the rack 232 meshing with the auxiliary barrel 234, in the same way as the ratchet 233 that imparts a to-and-fro motion to the second actuator 220, and this until the feeler-spindle 231 bearingly rests against the snail cam 230. When the feeler-spindle 231 reaches its active position, the ratchet 233 is immobilised and the rack 232 is separated from the auxiliary barrel 234, so that the feeler-spindle 231 is driven up to its rest position by the feeler-spindle return spring The clock 20 may include a cam 211 such as shown on the detailed view of FIG. 9 to drive the movement of the first actuator 210 of the clock 20. This cam 211 is different from the ratchet 233 of the second actuator 220 insofar as it has profile portions connected by ramps configured to move said first actuator 210 according to at least three distinct positions, one after another, so as to define a time cycle of predetermined positions that follow on at a defined speed.

In the preferred embodiment of the invention, the first actuator 210 takes the form of a control rod or of a control lever such as shown in FIGS. 2 and 9, and is also biased towards the cam 211 by elastic return means 212, as can be seen in FIG. 9. Thus, it is understood that the first actuator 210 may be translationally or rotationally moved by the cam 211, according to the embodiment considered.

It should be noted that, in the embodiment shown on the detailed view of FIG. 9, the cam 211 is intended to pivot in the anticlockwise direction, as opposed to the general view of the same FIG. 9 or the cam is intended to pivot in the clockwise direction for reasons specific to the construction of the mechanism.

The cam 211 is rotated by a dedicated energy source, such as a weight or a barrel, and is integral with a multiplication train and with a regulation mechanism consisting of an escapement and of an oscillator, so as to regulate its rotational speed, known as such by the person skilled in the art and shown on the detailed view of FIG. 9.

The clock 20 includes two control means 2130 and 2131 intended to permit or prohibit the pivoting of the first actuator 210 of the clock 20. In other words, the control means 2130 and 2131 are arranged to make it possible to rotate the cam 211 and thus modify the position of the first actuator 210 of the clock 20.

More specifically, the two control means 2130 and 2131 make it possible to permit or prohibit the rotation of the cam 211 over one revolution. In particular, one of the control means, referred to as "first control means" 2130, makes it possible to launch the rotation of the cam 211 and its immobilisation, that is to say start the time-setting method described in detail hereafter, and finish it. The other control means, referred to as "second control means" 2131 ensures the stopping of the first actuator 210 of the clock 20 during the movement of the second actuator 220 followed by the start of the waiting time of five minutes to re-release the first actuator 310 of the clock 20.

In the preferred embodiment shown in FIG. 9, each of the first and second control means 2130 and 2131 is formed by a lever intended to bearingly rest against the circumference of a control cam 2132 concentric to the cam 211 and integral with the latter. The circumference of the control cam 2132 includes at least one radial notch respectively intended to cooperate with the two control means 2130 and 2131.

The levers both comprise a beak provided to cooperate with the teeth of one of the discs of the multiplication train to immobilise said train.

In particular, when one of the levers cooperates with one of the notches, the beak of said lever comes to bear on one of the discs of the regulation train to, by taking advantage of the demultiplication of said train, lock the rotation thereof.

Alternatively, it is envisaged that the clock 20 only includes a single control means in the form of a lever, said lever then comprising two beaks. Furthermore, the control cam 2132 and the cam 211 may form a single one-piece cam.

The first control means 2130 is arranged to be maneuvered by the user.

The second control means 2131 is arranged to be controlled by the clock 20 at the next passage of five minutes following the end of the counting performed by the feeler-spindle 231, by a mechanism connected to the rotation of the minute displays of the clock 20. This in order to generate the waiting time to release the first actuator 310 of the clock 20.

When the first control means 2130 is maneuvered or controlled, it makes it possible to rotate the cam 211, and therefore bias the first actuator 310 of the watch 30 by the first actuator 210 of the clock 20, and consequently the movement of said first actuator 310 of the watch 30 from an initial position to a first position, that is to say the beginning of a first operational phase.

Preferably, this change of position is performed over a period of approximately five seconds and the first position is held for approximately five seconds.

A second operational phase then begins wherein the first actuator 210 of the clock 20 drives the movement of the first actuator 310 of the watch 30 in a second position. When the first actuator 310 is in this position, the second control means 2131 cooperates with the notch of the control cam 2132 so as to immobilise the cam 211 during the waiting time necessary for performing the function of the second actuator described above added to the waiting time of the next passage of the clock at the time displayed by the watch, by step of 5 minutes for example.

At the end of these two waiting times, a third phase is begun wherein the second control means 2131 is released from the notch of the control cam 2132, which makes it possible to relaunch the rotation of the cam 211 and thus the bias of the first actuator 310 of the watch 30 by the first actuator 210 of the clock 20, so that said first actuator 310 of the watch 30 occupies a third position corresponding to the initial position.

Preferably, this change of position is performed over a period of approximately 0.1 second and the third position is held by the cooperation of the first control means 2130 with the notch of the control cam 2132 so as to immobilise the cam 211.

In other words, the two control means 2130 and 2131 are configured to alternately permit or prohibit the actuation of the first actuator 210 of the clock 20.

The successive operational phases of the method for setting the time of the watch 30 by the clock 20 are described in detail hereafter and are implemented thanks to the change of position of the first actuator 310 of the watch 30 according to the time cycle of predetermined positions.

In the first operational phase following the initial phase, the first actuator 210 of the clock 20 drives the first actuator 310 of the watch 30 in the first position. The watch 30 in this first operational phase is shown in FIGS. 3 and 11.

In the preferred embodiment, in order to drive the first actuator 310 of the watch 30 in all of its positions, the first actuator 210 of the clock 20 presses against portions of the profile of the cam 211.

In particular, in the initial phase, the first actuator 210 of the clock 20 occupies the initial position wherein it presses against a sector 217 of a first portion 2170 of the profile of the cam 211. This first portion 2170 includes a first ramp 219 defining a cam radius increase making it possible to drive, from its initial position, the first actuator 310 of the watch 30 in its first position at a controlled speed, for example 5 seconds, during the first operational phase.

The first actuator 310 of the watch is driven in its first position when the first actuator 210 of the clock 20 reaches, after its travel along the first ramp 219, a second portion 214 of the cam 211.

The first operational phase is performed when the first actuator 210 of the clock 20 is bearing against the second portion 214. This second portion 214 is concentric, that is to say that the radius of the cam 211 on the second portion 214 is constant, so as to hold the first actuator 310 of the watch 30 in the first position over a predefined period, for example 5 seconds. This predefined period makes it possible to accomplish the following functions, during the first operational phase.

The first actuator 310 of the watch 30 is configured so that when it occupies the first position, it biases the reset mechanism so as to move the hour 31 and minute displays 32 of the watch 30 up to their reference position.

More specifically, when it moves to occupy the first position, the first actuator 310 of the watch 30 rotates the transmission lever 39 until the pin 395 engages in the notch 396 of the hammer 391. Thus, this makes it possible to move the hammer 391 in active position under the action of the hammer spring 392, and as a consequence move the hour 31 and minute displays 32 up to their reference position.

The first actuator 310 of the watch 30 is also configured so that when it occupies the first position, it acts on the coupling mechanism 38 so as to cause the uncoupling of the finishing train 36 and of the display train 35 and causes the driving of the stop lever 370 in a locking position of the resonator 34 of the watch 30.

In particular, in the preferred embodiment of the invention, the rotation of the transmission lever 39 caused by the movement of the first actuator 310 of the watch 30 towards its first position rotates, by means of the pin 395, the first and the second arm 380 and 381 towards one another, against the return force generated by the coupling spring 382, and thus the uncoupling of the coupling mechanism 38.

In the preferred embodiment of the invention, when the first actuator 310 of the watch 30 moves to occupy the first position, the rotation of the transmission lever 39 causes the movement of the stop lever 371 under the effect of the force generated by the stop lever spring until the stop lever 370 bearingly rests against the balance, consequently resulting in the stop of the resonator 34.

In the second operational phase, after the second portion 214 of the profile of the cam 211, the first actuator 210 of the clock 20 is bearingly driven against a ramp 216 of a third portion 2150 of the profile of the cam 211 up to reaching, within a practically immediate time frame, for example 0.1 second, a sector 215 of said third portion 2150. When it reaches this sector 215, the first actuator 210 of the clock 20 drives the first actuator 310 of the watch 30 in the second position.

The ramp 216 is defined by a decrease of the radial section, showing the radius, of the cam 211 by considering the direction of rotation of said cam 211 in the present text. In the second position, the first actuator 310 of the watch 30 is therefore more set back in relation to the watch 30 than when it occupies the first position.

Figure 12:
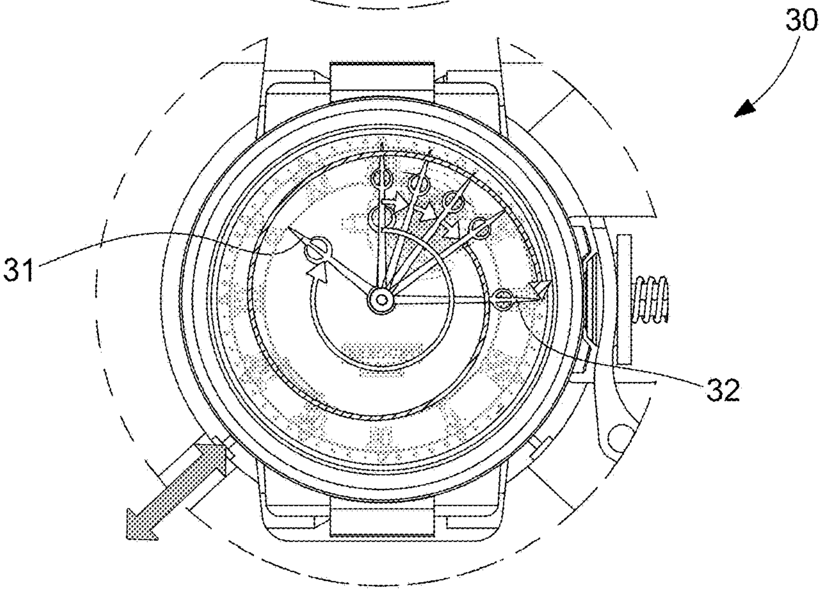

The watch 30 in this second operational phase is shown in FIGS. 4 and 12.

In this second position, the first actuator 310 of the watch 30 is configured so that it recoils the hammer 391, that is to say that it drives the hammer 391 at a distance from the heart-piece cam 390, in its inactive position.

More specifically, in the preferred embodiment of the invention, the pin 395 is forced to withdraw from the notch 396 of the hammer 391 during the movement of the transmission lever 39 caused by the first actuator 310 of the watch 30 when it is driven towards its second position. The pin 395 therefore subsequently rests against the flank of the hammer 391, and causes its rotation against the hammer spring 392.

Advantageously, the recoiling of the hammer 391 does not cause the position of the hour 31 and minute displays 32 of the watch 30 to be modified thanks to the cooperation between the jumper 393 and the toothed wheel 394 supported by the minute display disc.

The first actuator 210 of the clock 20 is configured so that, when it is driven in its second position, it causes the start of rotation of the ratchet 233 and the movement of the feeler-spindle 231 from its rest position up to its active position, and consequently the actuation of the second actuator 220 of the clock 20.

For this, the first actuator 210 of the clock 20 may for example act by means of a dedicated mechanism not shown in the figures, on the hook 241, so as to move it set back from the ratchet 233 in order to permit its rotation under the bias of the auxiliary barrel 234. The movement of the hook 241 has the effect of pivoting the coupling lever 240 so as to secure in rotation the first and the second toothed wheel 235 and 236 with one another, driving the rotation of the rack 232 under the bias of the auxiliary barrel 234 and thus the pivoting of the feeler-spindle 231 from its rest position up to its active position.

In other words, during this second operational phase, the second actuator 220 of the clock 20 therefore drives the second actuator 320 of the watch 30 in a to-and-fro motion between two end positions.

Moreover, the angular travel of the feeler-spindle 231 corresponds to the number of steps separating the time corresponding to the reference position of the displays of the watch 30, from the current time indicated by the displays of the clock 20.

The second actuator 320 of the watch 30 is arranged to drive, during each of its to-and-fro motions, the minute display 32 of the watch 30 one step of a given value via the time-setting control 321, the driving of the minute display 32 causing the movement of the hour display 31.

The value of the steps is an integer sub-multiple of the hour: one minute, two minutes, three minutes, four minutes, five minutes, six minutes, ten minutes, twelve minutes, fifteen minutes, twenty minutes, thirty minutes.

Advantageously, the snail cam 230 and the feeler-spindle 231 are configured in order that the second actuator 220 of the clock 20 drives the second actuator 320 of the watch 30 so as to move the minute display 32 so that the position of the minute 32 and hour displays 31 of the watch 30 corresponds to that of the minute 22 and hour displays 21 of the clock 20 added with at least one step.

In other words, during this second phase, the second actuator 320 of the watch 30 is biased by the second actuator 220 of the clock 20 so as to drive the hour 31 and minute displays 32 of the watch 30 by successive steps, up to a position corresponding to that of the current time increased by a predetermined additional number of steps, for example by a number of steps corresponding to a value of five minutes.

During this second operational phase, the second control means 2131 is arranged so as to immobilise the cam 211 during the actuation of the second actuator 220 of the clock 20, that is to say for the increased time-setting of the watch 30, and during the waiting time, for example of five minutes, at the end of said increased time-setting of the watch 30.

The third operational phase is activated, by the second control means 2131 controlled after the immobilisation of the second actuator 220 of the clock 20 and by the passage to the next whole 5 minutes of the clock 20 as described above. In this third operational phase, the cam 211 is rotated so that the first actuator 210 of the clock 20 presses against a fourth portion 218 of the profile of the cam 211 in the form of a ramp so as to drive the first actuator 310 of the watch 30 in its third position, that is to say in its initial position. The cam 211 is immobilised, in this third phase, by the first control means 2130.

The fourth portion 218 defines a decrease of the radial section of the cam 211 by considering the direction of rotation of said cam 211. In the third position, the first actuator 310 of the watch 30 is therefore more set back in relation to the watch 30 than when it occupies the second position.

Figure 13:
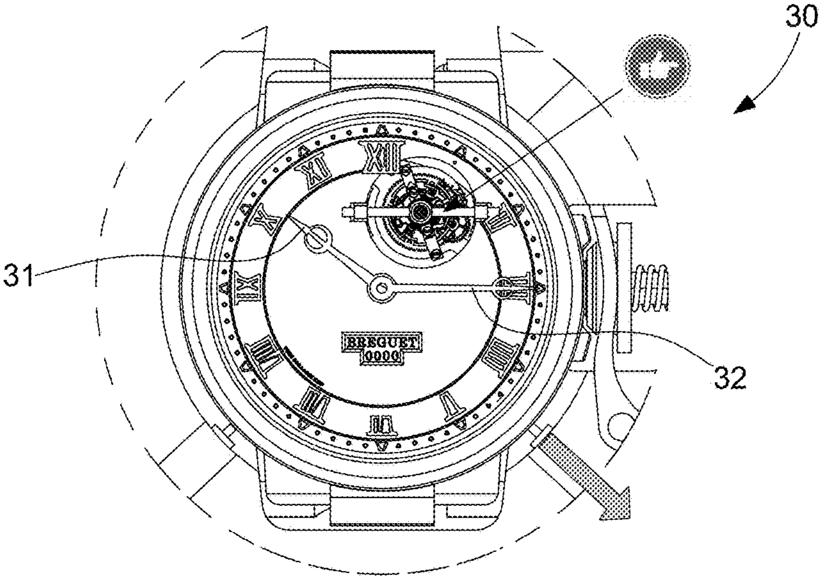

The watch 30 in this third operational phase is shown in FIGS. 5 and 13.

In this third position, the first actuator 310 of the watch 30 is configured to cause the coupling of the coupling mechanism 38 and the driving of the stop lever 370 in a release position of the resonator 34 of the watch 30. Optionally, the first actuator 310 of the watch 30 may be configured to, during this phase, hold the coiling of the hammer 391.

More specifically, during the movement of the first actuator 310 of the watch 30 towards its third position, the rotation of the transmission lever 39 rotates, by means of the pin 395, the first and the second arm 380 and 381 with one another according to opposite directions under the effect of the return force generated by the coupling spring 382.

Moreover, when the first actuator 310 of the watch 30 moves to occupy the third position, the rotation of the transmission lever 39 causes the movement of the stop lever control 371 against the force generated by the stop lever spring until the resonator 34 is released.

In addition, the jumper 393 is configured so that, during the movement of the transmission lever 39 when the first actuator 310 of the watch 30 is driven towards its third position, the pin 395 presses against one of its flanks so as to separate it from the toothed wheel 394, which makes it possible to release the rotation of the minute display 32 of the watch 30.

In other words, the first actuator 210 of the clock 20 is configured so as to control the first actuator 310 of the watch 30 to begin the implementation of the third operational phase, when the current time, that is to say the time indicated by the hour 21 and minute displays 22 of the clock 20, corresponds to the time indicated by the hour 31 and minute displays 32 of the watch 30.

The third phase corresponds to the initial phase, that is to say a state of the watch 30 wherein it is before the beginning of the first phase with the exception of the displays of the watch 30, which are in phase with those of the clock 20.

Preferably, the transmission lever 39 is subjected to a return force by a lever spring tending to move it in a position referred to as "initial position" corresponding to that wherein it is when the first actuator 310 of the watch 30 in the third position. This return force is advantageously dimensioned so that the transmission lever 39 is driven in initial position when the first actuator 310 of the watch 30 is not biased by the first actuator 210 of the clock 20, that is to say when the first actuator 310 of the watch 30 is in third position.

More particularly, the position of the first and second actuators 310 and 320 of the watch 30 in this third phase corresponds to rest positions wherein they are arranged, particularly, when the watch 30 does not cooperate with the clock 20.

It should be noted that the durations of the aforementioned operational phases and transitions between each of said phases are proportional of the angular amplitude whereon the profile portions of the cam 211 and the ramps between said portions extend.

More generally, it should be noted that the implementations and embodiments considered above have been described by way of non-limiting examples, and that other variants are consequently possible.

In particular, the transmission lever 39 may cooperate with each of the two arms 380 and 381, said arms 380 and 381 then being independent from one another and cooperating with a dedicated coupling spring.

Moreover, one of the arms 380 or 381 or the arms 380 and 381 may include an elastic portion so as to constitute the coupling spring. This feature advantageously makes it possible to avoid the use of a dedicated coupling spring.

It should also be noted that the transmission lever 39 may be replaced by a column wheel such as used in chronograph-type horological movements.

The invention claimed is:

1. A sympathique watch (30) configured to cooperate with a sympathique clock (20), comprising:

- a horological movement to which is connected at least one time value display (31, 32);
- a coupling mechanism (38) for separating a display train (35) and a finishing train (36);
- a reset mechanism configured to move the at least one time value display to a predetermined reference position; and
- a first and a second actuator (310, 320) respectively configured to cooperate with a first and a second actuator (210, 220) of the clock (20), said first actuator (310) of the watch (30) being configured to occupy at least three successive distinct positions so as to act on the coupling mechanism (38) and on the reset mechanism, said second actuator (320) of the watch (30) being configured to occupy two end positions alternately in order to act on a time-setting mechanism, only when the first actuator (310) occupies one of its successive distinct positions.

2. The watch (30) according to claim 1, wherein the first actuator (310) is configured to act on a stop mechanism (37) of a resonator (34) of the watch in two successive distinct positions.

3. The watch (30) according to claim 2, wherein the first actuator (310) of the watch (30) is configured to act on the coupling mechanism (38), on the stop mechanism (37) and on the reset mechanism by means of a transmission lever (39) to which the first actuator is connected, said transmission lever being configured to concomitantly bias the coupling mechanism (38) and the reset mechanism.

4. The watch (30) according to claim 3, wherein the transmission lever (39) extends between a first end of said lever at which said lever is rotatable and a second end including an excrescence (395) whereby said transmission lever (39) cooperates with the reset mechanism, with the coupling mechanism (38) and with the stop mechanism (37).

5. The watch (30) according to claim 3, wherein the transmission lever (39) is subjected to a return force by a lever spring tending to move the transmission lever to an initial position wherein the transmission lever drives the reset mechanism to an inactive position, the coupling mechanism (38) to a coupling position and the stop mechanism (37) to a position wherein the stop mechanism releases the resonator (34).

6. The watch (30) according to claim 3, wherein the coupling mechanism (38) includes two arms (380, 381) forming pliers, and a friction spring (383) tending to move the finishing train (36) engaged with the display train (35), the arms (380, 381) being biased by a coupling spring (382) towards a coupling position and being configured so that when the first actuator (310) occupies a first position, the arms are driven against the coupling spring (382), in an uncoupling position wherein the arms oppose an action of the coupling spring (382) and of the friction spring (383) in order to move said finishing train (36) away from the display train (35), and wherein the arms (380, 381) cooperate with one another at an interface area whereby one of the arms, corresponding to a first arm, is capable of forcing the other arm, corresponding to a second arm, to move towards the coupling position under the effect of the return force generated by the coupling spring (382), and whereby the second arm (381) is capable of transmitting to the first arm (380) a force to which the first arm is subjected by the transmission lever (39) when the first actuator (310) occupies the first position, the force moving said arms (380, 381) in the uncoupling position.

7. The watch (30) according to claim 3, wherein the reset mechanism includes at least one heart-piece cam (390) integral in rotation with the time value display (31, 32) and at least one hammer (391) arranged to bearingly cooperate with said at least one heart-piece cam (390) under an action of a hammer spring (392), so as to occupy an active position and force in rotation said heart-piece cam (390) until the heart-piece cam is bearing against a smallest radius thereof, when the first actuator (310) occupies a first position, the hammer (391) being configured to be returned and held in an inactive position by the transmission lever (39), wherein the transmission lever is moved away from said heart-piece cam (390), when the first actuator (310) occupies another position.

8. The watch (30) according to claim 3, wherein the stop mechanism (37) includes a stop lever (370) subjected to a bias of a spring tending to rotate the stop lever so that said stop lever (370) is bearingly arranged against a balance of the resonator (34), the transmission lever (39) being configured so that the excrescence (395) exerts a force going against that of the spring applied against said stop lever (371).

9. The watch (30) according to claim 4, wherein the reset mechanism includes at least one heart-piece cam (390) integral in rotation with the time value display (31, 32) and at least one hammer (391) arranged to bearingly cooperate with said at least one heart-piece cam (390) under the action of a hammer spring (392), so as to occupy an active position and force in rotation said heart-piece cam (390) until the heart-piece cam is bearing against a smallest radius thereof, when the first actuator (310) occupies a first position, the hammer (391) being configured to be returned and held in an inactive position by the transmission lever (39), wherein the transmission lever is moved away from said heart-piece cam (390), when the first actuator (310) occupies another position, and wherein the transmission lever (39) is configured so that the excrescence (395) is engaged in a notch (396) of the hammer (391) in order that the hammer is driven in active position under the action of the hammer spring (392) and so that the excrescence (395) is removed from the notch (396) and rests bearing against a flank of said hammer (391) in order to drive the hammer in inactive position and to hold the hammer in the inactive position.

10. The watch (30) according to claim 1, wherein the coupling mechanism (38) includes two arms (380, 381) forming pliers, and a friction spring (383) tending to move the finishing train (36) engaged with the display train (35), the arms (380, 381) being biased by a coupling spring (382) towards a coupling position and being configured so that when the first actuator (310) occupies a first position, the arms are driven against the coupling spring (382), in an uncoupling position wherein the arms oppose an action of the coupling spring (382) and of the friction spring (383) in order to move said finishing train (36) away from the display train (35).

11. The watch (30) according to claim 1, wherein the horological movement of the watch (30) includes a toothed wheel (394) supported by a minute display disc and cooperating with a jumper (393) for holding in position a minute display (32) according to a regular step.

12. The watch (30) according to claim 1, wherein the time-setting mechanism includes a time-setting mobile component (321) adapted to be biased by an impulse of the second actuator (320) of the watch (30) so as to drive a minute display disc in rotation one step per impulse of the second actuator (320) of the watch (30) and in a single direction of rotation.

13. A sympathique horological assembly (10) comprising the sympathique watch (30) according to claim 1 and a sympathique clock (20).

14. A method for setting a time of the watch of the sympathique horological assembly (10) according to claim 13, successively comprising:

- a first operational phase wherein the first actuator (210) of the clock (20) drives the first actuator (310) of the watch (30) in a first position to bias the reset mechanism so as to move at least one time value display (31, 32) of the watch (30) up to its reference position, to act on the coupling mechanism (38) so as to cause an uncoupling of the finishing train (36) and of the display train (35),
- a second operational phase wherein the first actuator (210) of the clock (20) drives the first actuator (310) of the watch (30) in a second position wherein the first actuator drives the hammer (391) in inactive position, and causes the actuation of the second actuator (220) of the clock (20) to drive the second actuator (320) of the watch (30) in a to-and-fro motion between two end positions thereof, and
- a third operational phase wherein the first actuator (210) of the clock (20) drives the first actuator (310) of the watch (30) in a third position wherein the first actuator causes a coupling of the coupling mechanism (38), the first actuator (210) of the clock (20) controlling the first actuator (310) of the watch (30) to begin an implementation of the third operational phase, when the time value indicated by the time value display(s) (31, 32) of the clock (20) corresponds to the time value indicated by the time value display(s) (31, 32) of the watch (30).

15. The method according to claim 14, wherein, during the first operational phase, the first actuator (310) of the watch (30) biases the stop mechanism (37) so as to immobilise the resonator (34), during the second operational phase, the first actuator (310) of the watch (30) holds in position the stop mechanism (37), and during the third operational phase, the first actuator (310) of the watch (30) biases the stop mechanism (37) so as to release the resonator (34).

16. A sympathique clock (20) configured to cooperate with the sympathique watch (30) according to claim 1, including at least one clock time value display (21, 22) driven by a clock horological movement characterised in that the clock includes a first and a second actuator (210, 220) configured to cooperate respectively with the first and the second actuator (310, 320) of the watch (30), the first actuator (210) of the clock (20) being configured so as to move the first actuator (310) of the watch (30) in its at least three successive distinct positions, and the second actuator (220) of the clock (20) being configured so as to move the second actuator (320) of the watch (30) between its two positions, by a to-and-fro motion, when the first actuator of the watch occupies one of its positions, the horological movement of the clock (20) including at least one control means (213) configured to control or prohibit the movement of the first actuator (210) of the clock (20).

17. The sympathique clock (20) according to claim 16, wherein the horological movement of the clock (20) comprises a snail cam (230) kinematically connected to the time value display(s) (21, 22) of the clock (20), so that an angular position of the snail cam characterises a value of said time value display(s) (21, 22), and on the periphery of which is bearingly arranged a first end of a feeler-spindle (231) when occupying an active position, said first end being set back from the snail cam (230) when the feeler-spindle (231) occupies a rest position, the horological movement being configured to drive in movement the second actuator (220) of the clock (20), during a travel of the feeler-spindle (231) between a rest position thereof and an active position thereof, according to a number of to-and-fro motions representative of the difference between a reference position of the time value display(s) (31, 32) of the watch (30) and the time value indicated by the time value display(s) (21, 22) of the clock (20).

18. The sympathique clock (20) according to claim 17, wherein the feeler-spindle (231) includes at a second end opposite the first end, a rack (232) arranged to cooperate with a first toothed wheel (235) of a transmission train, said transmission train comprising a second toothed wheel (236) connected to the second actuator (220) of the clock (20) so as to move in a to-and-fro motion during the movement of the feeler-spindle (231) from its rest position up to its active position.

19. The sympathique clock (20) according to claim 18, wherein the second toothed wheel (236) meshes with a ratchet (233) rotated by a dedicated energy source and including a plurality of triangular teeth against one of which is configured to be bearingly arranged the second actuator (220) of the clock (20) in such a way as to be animated by a to-and-fro motion during the rotation of the ratchet (233).

20. The sympathique clock (20) according to claim 18, wherein the second toothed wheel (236) is connected to the second actuator (220) of the clock (20) by means of a connecting rod-crank handle mechanism, the connecting rod of which is configured to be integral with the second actuator (220) of the clock (20) and the crank handle of which is integral in rotation with the second toothed wheel (236).

21. The sympathique clock (20) according to claim 18, wherein the horological movement of the clock (20) includes a coupling lever (240) adapted to occupy an uncoupling position wherein the coupling lever separates the first toothed wheel (235) and an auxiliary barrel (234) configured to rotate said first toothed wheel (235) and the second toothed wheel (236), said horological movement of the clock (20) further comprising an all-or-nothing device (242) configured to cooperate with the coupling lever (240) so as to drive the coupling lever to the uncoupling position when the feeler-spindle (231) reaches its active position, so that said feeler-spindle (231) is driven in a rest position under the effect of a feeler-spindle return spring.

22. The sympathique clock (20) according to claim 16, wherein the horological movement of the clock (20) comprises a cam (211) rotated by a dedicated energy source and including a cam profile against which the first actuator (210) of the clock (20) is bearingly arranged, said cam profile including successive portions adapted to move said first actuator (210) of the clock according to at least three distinct positions, so as to define a time cycle of predetermined positions.

23. The sympathique clock (20) according to claim 22, wherein said at least one control means (213) is configured to lock or release the rotation of the cam (211).

* * * * *